United States Patent

[11] 3,621,296

[72] Inventor Martin Berger
4321 Miller Road, Scottsdale, Ariz. 85251
[21] Appl. No. 865,768
[22] Filed Oct. 13, 1969
[45] Patented Nov. 16, 1971

[54] POWER PULSE CIRCUIT
3 Claims, 4 Drawing Figs.

[52] U.S. Cl. 307/252 N, 307/269, 307/284, 328/67
[51] Int. Cl. H03k 4/80, H03k 17/72
[50] Field of Search 307/252 N, 252 R, 252 G, 284, 246; 328/67

[56] References Cited
UNITED STATES PATENTS

| | | | |
|---|---|---|---|
| 3,078,391 | 2/1963 | Bunodiere et al. | 328/67 X |
| 3,267,337 | 8/1966 | Doyle et al. | 307/252 N X |
| 3,323,014 | 5/1967 | West | 315/194 |
| 3,329,867 | 7/1967 | Stearns | 307/284 X |
| 3,346,874 | 10/1967 | Howell | 307/252 X |
| 3,364,440 | 1/1968 | Schreiner | 307/252 G X |
| 3,408,513 | 10/1968 | Cooper et al. | 307/284 X |

OTHER REFERENCES

G.E. SCR Manual, 4 th Edition, 1967; p. 79 & Fig. 430.

*Primary Examiner*—Donald D. Forrer
*Assistant Examiner*—Larry N. Anagnos
*Attorney*—Leonard H. King

ABSTRACT: A line-synchronized pulse generator used in conjunction with a controlled rectifier which will supply a single current pulse each time a switch is closed.

INVENTOR.
MARTIN BERGER
BY
Leonard H. King
ATTORNEY

POWER PULSE CIRCUIT

The present invention relates to trigger pulse circuits and more specifically to a power pulse circuit for driving a resistive load and an inductive load such as a solenoid or stepping motor.

BACKGROUND OF THE INVENTION

Present design techniques generally require an auxiliary DC voltage to be applied to the trigger-generating circuitry to generate the triggering pulse. This pulse is then used to fire a thyristor device in series with the load. The auxiliary DC voltage is obtained from a battery or from the input powerline with a transformer, rectifier and filter. A large value capacitor of the electrolytic type is usually employed to either delay the trigger pulse or to discharge through the load to insure singular pulse operation when a switch is activated. The additional components which are required increase the cost and size and reduce the reliability of the circuit.

SUMMARY OF THE INVENTION

The power pulse circuit of the present invention operates directly from the input AC powerline and generates a pulse synchronized to the line frequency which will fire a thyristor just once each time a switch is activated. This pulse can be used to provide a positive single-step operation of a solenoid. The power pulse circuit automatically resets itself after the switch is released when the AC input voltage reverses polarity, thereby insuring reliable operation.

An object of the present invention is the provision of a power pulse circuit capable of reliably driving heavy current loads.

Another object of this invention is to provide a pulse circuit which operates directly from the AC line and reliably generates large current pulses.

An additional object of this invention is to provide a pulse circuit which operates directly from the AC line and generates a single large current pulse into a load each time a switch is activated.

Another object of this invention is to provide a pulse circuit which operates directly from the AC line and generates a single power pulse in synchronization with the AC line each time it is activated.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
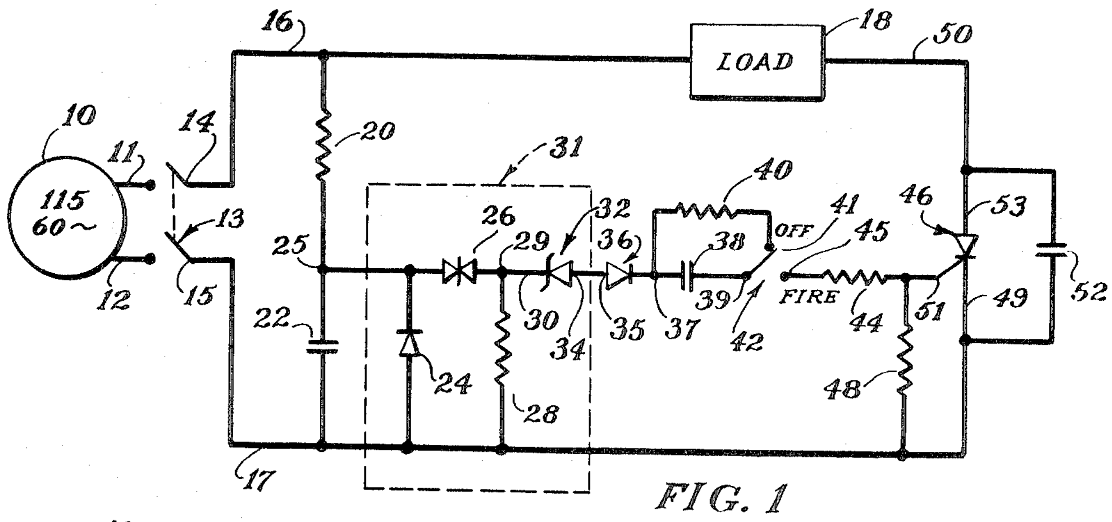
FIG. 1 is a schematic diagram of an embodiment of the invention.

Referring to the drawings, there is shown in FIG. 1 a source of alternating voltage 10. The terminals of the source 10 are connected to a first bus 11 and a second bus 12 which are both connected to the normally open double-pole switch 13. A single-pole switch could of course be employed to open one side of the line. The output terminals 14 and 15 of switch 13 are connected to bus 16 and 17, respectively. Bus 16 is then connected to the load 18. Resistor 20 is connected in series with capacitor 22 across buses 16 and 17. A diode 24 is connected from the junction 25 of resistor 20 and capacitor 22 to bus 17. A thyristor device 26, which is a three-layer bilateral trigger device in the present embodiment, is connected from the junction 25 to one end of resistor 28. The other end of resistor 28 is connected to bus 17. The junction 29 of the thyristor 26 and resistor 28 is connected to the cathode 30 of a zener diode 32. The anode 34 of the zener diode 32 is connected in series to the anode 35 of diode 36. The cathode 37 of diode 36 is connected to one end of capacitor 38 and one end of resistor 40. The other end of resistor 40 is connected to the normally closed contact 41 of switch 42 while the other end of capacitor 38 is connected to the switch arm 39. Resistor 44 is connected between the normally open contact 45 of switch 42 to the gate of the silicon-controlled rectifier 46. Resistor 48 is connected across the cathode 49 and gate 51 of the controlled rectifier 46 while the cathode 49 of the controlled rectifier 46 is connected to bus 17. The anode of the controlled rectifier 53 is connected to the load 18 by bus 50. Capacitor 52 is connected across the cathode 49 and anode 53 of controlled rectifier 46. Components 24, 26, 28 and 30 may generally be referred to as the trigger circuit 31.

Figure 2:
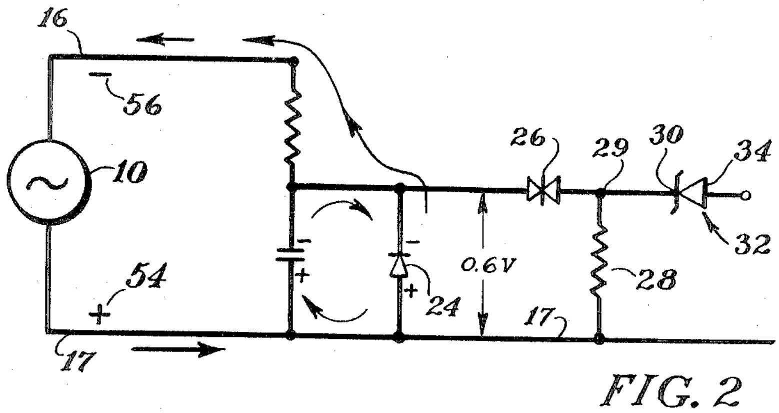
FIG. 2 is a schematic diagram of the pulse-forming network indicating current flow during the reset half of the cycle.

The operation of the present embodiment may be followed by referring to FIG. 2. The instantaneous polarity of the input voltage on one-half of the cycle is assumed to be as shown after the closing of switch 13. The current will flow in the direction of the arrows from the plus side 54 of the voltage source 10 through diode 24 and resistor 20 to the negative side 56 of voltage source 10. The capacitor 22 will be required to discharge to the forward voltage drop of diode 24 which for a silicon diode is approximately 0.6 of a volt. This will act to reset the pulse forming network (trigger circuit) portion of the invention. A second thyristor device, which is a silicon-controlled rectifier 46 in the present embodiment will also be reset with the source voltage at this polarity since only small amounts of leakage current will flow through the silicon-controlled rectifier (SCR) when its cathode is positive with respect to its anode.

Figures 3, 4:
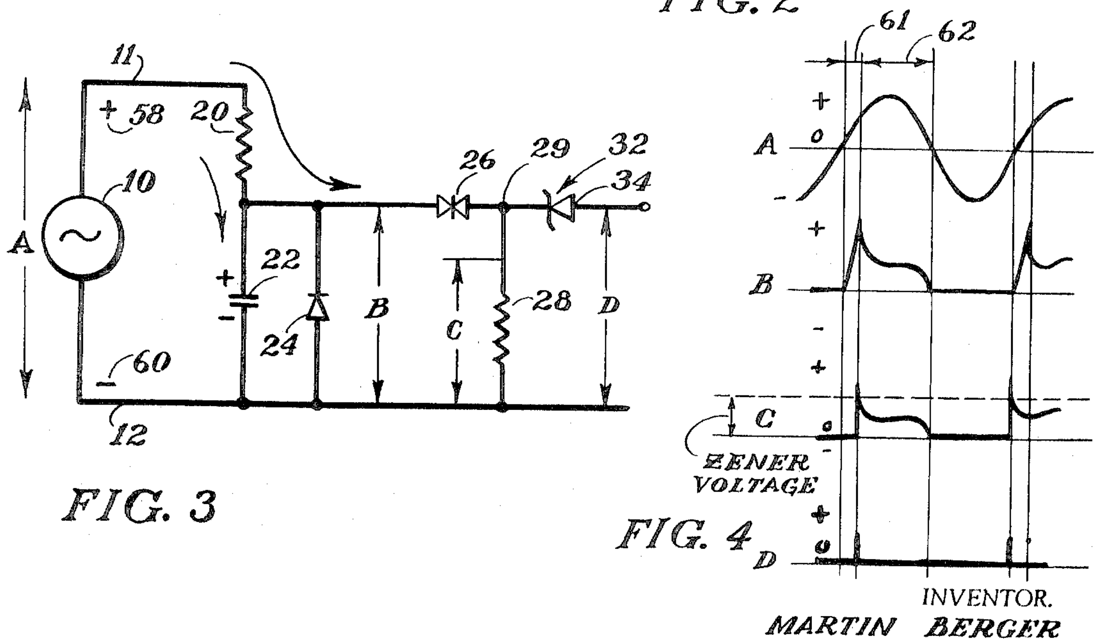
FIG. 3 is a schematic diagram of the pulse-forming network indicating current flow during the charging half of the cycle.
FIG. 4 indicates the voltage wave shapes occurring at various points in the circuit.

When the input voltage source polarity reverses as shown in FIG. 3, the current will flow from the plus 58 of the source 10 through resistor 20 to the minus 60 of the source, causing capacitor 22 to start to charge. As soon as the voltage across capacitor 22 reaches the firing point of the thyristor 26, capacitor 22 will discharge in a very short time through thyristor 26 and resistor 28 to a lower voltage. After capacitor 22 discharges, current will flow through resistor 20, thyristor 26 and resistor 28. This will maintain the trigger diode 26 in its "on" or "conducting" state with a low-voltage drop across it as long as the current flow through it remains above the holding current specified by the manufacturer. The required value of current is obtained by the proper selection of resistors 20 and 28. When the powerline voltage drops so low that the current through resistors 20 and 28 is less than the holding current of trigger diode 26, the diode 26 reverts to its "off" or "-nonconducting" state. Current flow through resistor 28 is thereafter blocked until the voltage drop across capacitor 22 again exceeds the breakover voltage of trigger diode 26.

The voltages appearing at various points in the circuit are shown in FIG. 4. The charging of capacitor 22 occurs during the positive half of the cycle (FIG. 4A). At the end of time interval 61 the breakover voltage is reached causing thyristor 26 to change to the "on" state.

The voltage appearing across resistor 28 due to the capacitor 22 current and the holding current flowing through it is shown in FIG. 4C, while the voltage appearing across capacitor 22 is shown in FIG. 4B.

As long as switch 42 (FIG. 1) is left in the open position no voltage pulse is available to fire the silicon-controlled rectifier 46 and any charge remaining on capacitor 38 is dissipated by resistor 40. Resistor 40 is chosen to discharge capacitor 38 within a desired time rate so that the system is disabled after each firing until it is safe for the next firing. When switch 42 is closed the voltage appearing across resistor 28 will cause a current pulse to flow through zener diode 32, diode 36, capacitor 38, resistor 44, and resistor 48. This pulse of current will only flow during the portion of the cycle that the voltage across resistor 28 exceeds the breakover voltage of zener diode 32. (Refer to FIGS. 4C and 4D). This condition prevails for a very short period only once each cycle of input line frequency, and is always at the same phase angle. The voltage across resistor 48 is of sufficient amplitude to cause the silicon-controlled rectifier 46 to be turned on to the "on" or "-fired" state, thereby permitting the source 10 to have a low impedance path through the load 18. This will cause a heavy pulse of current to flow through the load 18. Resistor 44 is selected to limit the current surge into the gate of the silicon-controlled rectifier 46 when it is "fired." Capacitor 52 will insure that line transients or the initial turning on of power, by closing switch 13, will not falsely fire the controlled rectifier 46.

If switch 42 is left closed for more than one cycle of power source frequency, additional firing will not occur. The charge on capacitor 38 is not permitted to leak off because of the blocking action of diode 36. Additional pulses generated by thyristor 26, occurring in synchronism with the powerline frequency, will not be permitted to flow through resistors 44 and 48 because capacitor 38 is already charged to the pulse voltage by the first pulse that fired the controlled rectifier 46. Thus, a reliable power pulse circuit has been disclosed which will operate directly from the AC line and will reliably generate a single high-current pulse, of consistent and predictable time duration, precisely delayed, each time a switch is closed, and does not require the use of an electrolytic capacitor.

There has been disclosed heretofore the best embodiment of the invention presently contemplated and it is to be understood that various changes and modifications may be made by those skilled in the art without departing from the spirit of the invention.

What I claim as new and desire to secure by Letters patent is:

1. A power pulse circuit for supplying large current pulses to a load comprising:

a. a trigger circuit;

b. a first thyristor device, having an anode connected in series with a load;

c. means connecting a source of alternating current across said thyristor and said load in series and to said trigger circuit;

d. a first capacitor;

e. a first resistor connected across said first capacitor to adjust its discharge time;

f. a first diode for blocking the discharge current of said first capacitor;

g. a switch for connecting said first capacitor and said first diode said switch being connected in series between said trigger circuit and said thyristor gate, whereby the trigger pulse is caused to flow through said capacitor and said diode to turn on said thyristor.

2. A power pulse circuit as recited in claim 1 wherein the trigger circuit comprises:

a. a second resistor;

b. a second capacitor connected in series with said second resistor across said source of alternating current;

c. a second diode having an anode and cathode connected across said capacitor, the cathode being connected to the junction of said second resistor and said capacitor and the anode being connected to said alternating current source;

d. a third resistor having one end connected to the anode of said second diode;

e. a second thyristor device connected between the cathode of said second diode and the other end of said third resistor;

f. a breakover diode having an anode and a cathode;

g. means connecting the cathode of said breakover diode to the junction of said third resistor and said thyristor device; and h. means connecting the anode of said breakover diode to the anode of said first diode.

3. A power pulse circuit as recited in claim 2 wherein said first thyristor device is a silicon-controlled rectifier, said second thyristor device is a three-layer bilateral trigger and said breakover diode is a zener diode.

* * * * *